(12) United States Patent
Togashi et al.

(10) Patent No.: US 8,116,064 B2
(45) Date of Patent: Feb. 14, 2012

(54) MULTILAYER CAPACITOR

(75) Inventors: Masaaki Togashi, Tokyo (JP); Hiroshi Okuyama, Tokyo (JP); Yutaro Kotani, Tokyo (JP)

(73) Assignee: TDK Corporation, Tokyo (JP)

( * ) Notice: Subject to any disclaimer, the term of this patent is extended or adjusted under 35 U.S.C. 154(b) by 390 days.

(21) Appl. No.: 12/429,611

(22) Filed: Apr. 24, 2009

(65) Prior Publication Data
US 2010/0027189 A1    Feb. 4, 2010

(30) Foreign Application Priority Data
Jul. 29, 2008 (JP) ................................. 2008-195102

(51) Int. Cl.
*H01G 4/228* (2006.01)

(52) U.S. Cl. .................. 361/306.3; 361/306.1; 361/311; 361/328; 361/330

(58) Field of Classification Search .......................... None
See application file for complete search history.

(56) References Cited

U.S. PATENT DOCUMENTS 6,587,327 B1 * 7/2003 Devoe et al. ............... 361/306.3
7,133,274 B2 * 11/2006 Hidaka et al. ................. 361/303

FOREIGN PATENT DOCUMENTS

JP         A-06-349666         12/1994

* cited by examiner

*Primary Examiner* — Eric Thomas
*Assistant Examiner* — Dion Ferguson
(74) *Attorney, Agent, or Firm* — Oliff & Berridge, PLC

(57) ABSTRACT

An element body has a major capacitance forming portion to form a first capacitance, and a minor capacitance forming portion to form a plurality of second capacitances smaller than the first capacitance. The major capacitance forming portion includes a first internal electrode connected to a first terminal electrode, and a second internal electrode opposed to the first internal electrode and connected to a second terminal electrode. The minor capacitance forming portion includes a third internal electrode connected to the first terminal electrode, a fourth internal electrode arranged as separated from the third internal electrode in an identical layer and connected to the second terminal electrode, a fifth internal electrode opposed to the third and fourth internal electrodes and connected to the first terminal electrode, and a sixth internal electrode opposed to the third and fourth internal electrodes and opposed to the fifth internal electrode through a region between the third and fourth internal electrodes, and connected to the second terminal electrode.

10 Claims, 10 Drawing Sheets

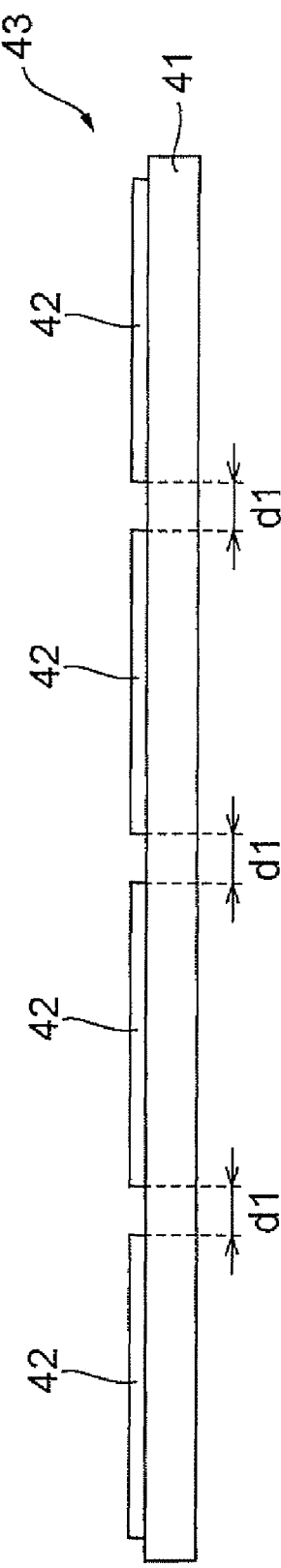
Fig.4A
Fig.4B

MULTILAYER CAPACITOR

BACKGROUND OF THE INVENTION

1. Field of the Invention

The present invention relates to a multilayer capacitor.

2. Related Background Art

There is a conventional multilayer capacitor having an element body of a nearly rectangular parallelepiped shape composed of dielectric layers and internal electrodes laminated alternately, and first and second terminal electrodes formed on two end faces of the element body. Japanese Patent Application Laid-open No. 6-349666 discloses the multilayer capacitor having alternating layers of a pair of internal electrodes connected to the first terminal electrode and arranged next to each other in a laminate direction, and a pair of internal electrodes connected to the second terminal electrode and arranged next to each other in the laminate direction.

SUMMARY OF TIE INVENTION

The Quality factor (Q-factor) of the multilayer capacitor disclosed in Japanese Patent Application Laid-open No. 6-349666 is higher than that of a multilayer capacitor in which internal electrodes connected to terminal electrodes of opposite polarities are alternated layer by layer and which has an identical capacitance. This is because the number of internal electrodes carrying an electric current is larger and the resistance of the internal electrodes is smaller relative to the capacitance formed.

While the multilayer capacitor disclosed in the foregoing Laid-open No. 6-349666 has the higher Q-factor, the number of laminated internal electrodes is large enough to readily cause a lamination deviation of internal electrodes. If the position of the internal electrodes to form the capacitance deviates in a plane direction perpendicular to the laminate direction, the capacitance will vary. For this reason, variation in the capacitance of the multilayer capacitor tends to become significant. The variation in capacitance can be a more serious problem, particularly, in production of the multilayer capacitor with a small capacitance because a permissible tolerance is small for capacitance.

The present invention has been accomplished in order to solve the above problem and an object of the invention is to provide a multilayer capacitor having a high Q-factor and permitting suppression of the variation in capacitance.

The present invention provides a multilayer capacitor comprising: an element body formed in a nearly rectangular parallelepiped shape; and at least a pair of terminal electrodes formed on respective end faces opposed to each other in the element body, and having opposite polarities, wherein the element body includes a major capacitance forming portion to form a capacitance, and first to third minor capacitance forming portions to form respective capacitances smaller than the capacitance formed by the major capacitance forming portion, wherein the major capacitance forming portion is formed by internal electrodes connected to the respective terminal electrodes of the opposite polarities, and wherein the first to third minor capacitance forming portions are formed by internal electrodes connected to the respective terminal electrodes of the opposite polarities and arranged as separated in an identical layer, and internal electrodes connected to the respective terminal electrodes of the opposite polarities and opposed to each other through a region between the internal electrodes arranged in the identical layer, and both opposed to the internal electrodes arranged in the identical layer.

The multilayer capacitor of the present invention has the major capacitance forming portion and the first to third minor capacitance forming portions as portions to form their respective capacitances. For this reason, the number of internal electrodes contributing to formation of the capacitance can be made larger than in the case where the capacitance is formed by the major capacitance forming portion only. Namely, the number of internal electrodes carrying an electric current becomes larger. Therefore, the resistance of the multilayer capacitor is small, while the Q-factor is high.

The first to third minor capacitance forming portions are formed by the internal electrodes connected to the respective terminal electrodes of the opposite polarities and arranged as separated in the identical layer, and the internal electrodes connected to the respective terminal electrodes of the opposite polarities and opposed to each other through the region between the internal electrodes arranged in the identical layer, and both opposed to the internal electrodes arranged in the identical layer. Namely, the internal electrodes opposed to each other through the region between the internal electrodes arranged in the identical layer form the first minor capacitance forming portion. The second minor capacitance forming portion is formed by one internal electrode out of the internal electrodes forming the first minor capacitance forming portion, and one internal electrode out of the internal electrodes arranged in the identical layer. The third minor capacitance forming portion is formed by the other internal electrode out of the internal electrodes forming the first minor capacitance forming portion, and the other internal electrode out of the internal electrodes arranged in the identical layer. For this reason, if the internal electrodes arranged in the identical layer deviate in an arrangement direction of the internal electrodes, the capacitance formed by one minor capacitance forming portion out of the second and third minor capacitance forming portions will decrease, whereas the capacitance formed by the other minor capacitance forming portion will increase. At this time, the capacitance formed by the first minor capacitance forming portion is subjected to little change. Therefore, it is feasible to suppress change in the sum of the capacitances formed by the first to third minor capacitance forming portions, and thus to suppress occurrence of variation in capacitance.

Preferably, one internal electrode out of the internal electrodes forming the major capacitance forming portion, and one internal electrode out of the internal electrodes opposed to each other through the region between the internal electrodes arranged in the identical layer are an identical internal electrode.

In this case, the major capacitance forming portion and the first to third minor capacitance forming portions can be formed by at least five internal electrodes.

Preferably, one internal electrode out of the internal electrodes forming the major capacitance forming portion, and one internal electrode out of the internal electrodes opposed to each other through the region between the internal electrodes arranged in the identical layer are electrically connected to the terminal electrode of the same polarity and arranged next to each other.

In this case, the major capacitance forming portion and the first to third minor capacitance forming portions can be formed by at least six internal electrodes. For this reason, the Q-factor can be made higher than in the case where the major capacitance forming portion and the first to third minor capacitance forming portions are formed by at least five internal electrodes.

Preferably, one internal electrode out of the internal electrodes forming the major capacitance forming portion, and one internal electrode out of the internal electrodes opposed to each other through the region between the internal electrodes arranged in the identical layer are connected to the respective terminal electrodes of the opposite polarities and arranged as separated in an identical layer.

In this case, the major capacitance forming portion and the first to third minor capacitance forming portions can be formed by at least six internal electrodes. For this reason, the Q-factor can be made higher than in the case where the major capacitance forming portion and the first to third minor capacitance forming portions are formed by at least five internal electrodes. If one internal electrode out of the internal electrodes forming the major capacitance forming portion, and one internal electrode out of the internal electrodes opposed to each other through the region between the internal electrodes arranged in the identical layer, deviate in their arrangement direction, the capacitance formed by one capacitance forming portion out of the major capacitance forming portion and the second minor capacitance forming portion will decrease, whereas the capacitance formed by the other capacitance forming portion will increase; therefore, it is feasible to suppress change in the sum of the capacitances formed by the major capacitance forming portion and the first to third minor capacitance forming portions. In consequence, it is feasible to suppress occurrence of variation in capacitance.

Preferably, each of the internal electrodes arranged in the identical layer is so arranged that a distance to one internal electrode out of the internal electrodes opposed to each other through the region between the internal electrodes arranged in the identical layer is substantially equal to a distance to the other internal electrode out of the internal electrodes opposed to each other through the region between the internal electrodes arranged in the identical layer.

In this case, if the internal electrodes forming the first to third minor capacitance forming portions and arranged in the identical layer deviate in their arrangement direction, the capacitance formed by one minor capacitance forming portion out of the second and third minor capacitance forming portions will decrease, whereas the capacitance formed by the other minor capacitance forming portion will increase by the degree of decrease. Therefore, the sum of the capacitances formed by the first to third minor capacitance forming portions is kept approximately constant, whereby it is feasible to further suppress occurrence of variation in capacitance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 4A and 4B are schematic views for explaining a method of producing the multilayer capacitor according to the first embodiment.

DESCRIPTION OF THE PREFERRED EMBODIMENTS

The best mode for carrying out the present invention will be described below in detail with reference to the accompanying drawings. In the description of the drawings the same elements will be denoted by the same reference symbols, without redundant description.

(First Embodiment)

Figure 1:
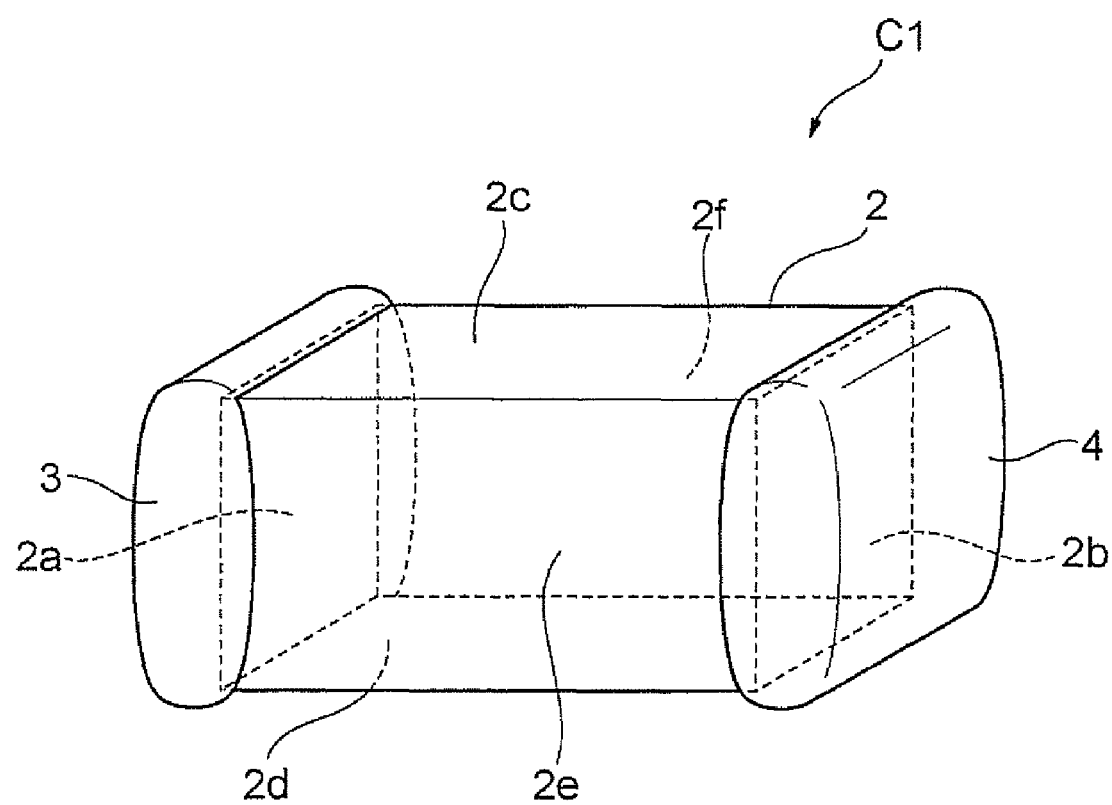
FIG. 1 is a schematic perspective view of a multilayer capacitor according to the first embodiment.

A configuration of a multilayer capacitor C1 according to the present embodiment will be described with reference to FIGS. 1 to 3. FIG. 1 is a schematic perspective view of the multilayer capacitor according to the present embodiment. The multilayer capacitor C1 has an element body 2 of a nearly rectangular parallelepiped shape, and a first terminal electrode 3 and a second terminal electrode 4 formed on respective end faces 2a, 2b of the element body 2.

The element body 2 has the end faces 2a, 2b opposed to each other, side faces 2c, 2d opposed to each other, and side faces 2e, 2f opposed to each other. The first terminal electrode 3 formed on the end face 2a of the element body 2 covers the entire area of the end face 2a and also covers regions of the side faces 2c-2f on the end face 2a side. The second terminal electrode 4 formed on the end face 2b of the element body 2 covers the entire area of the end face 2b and also covers regions of the side faces 2c-2f on the end face 2b side.

Figure 2:
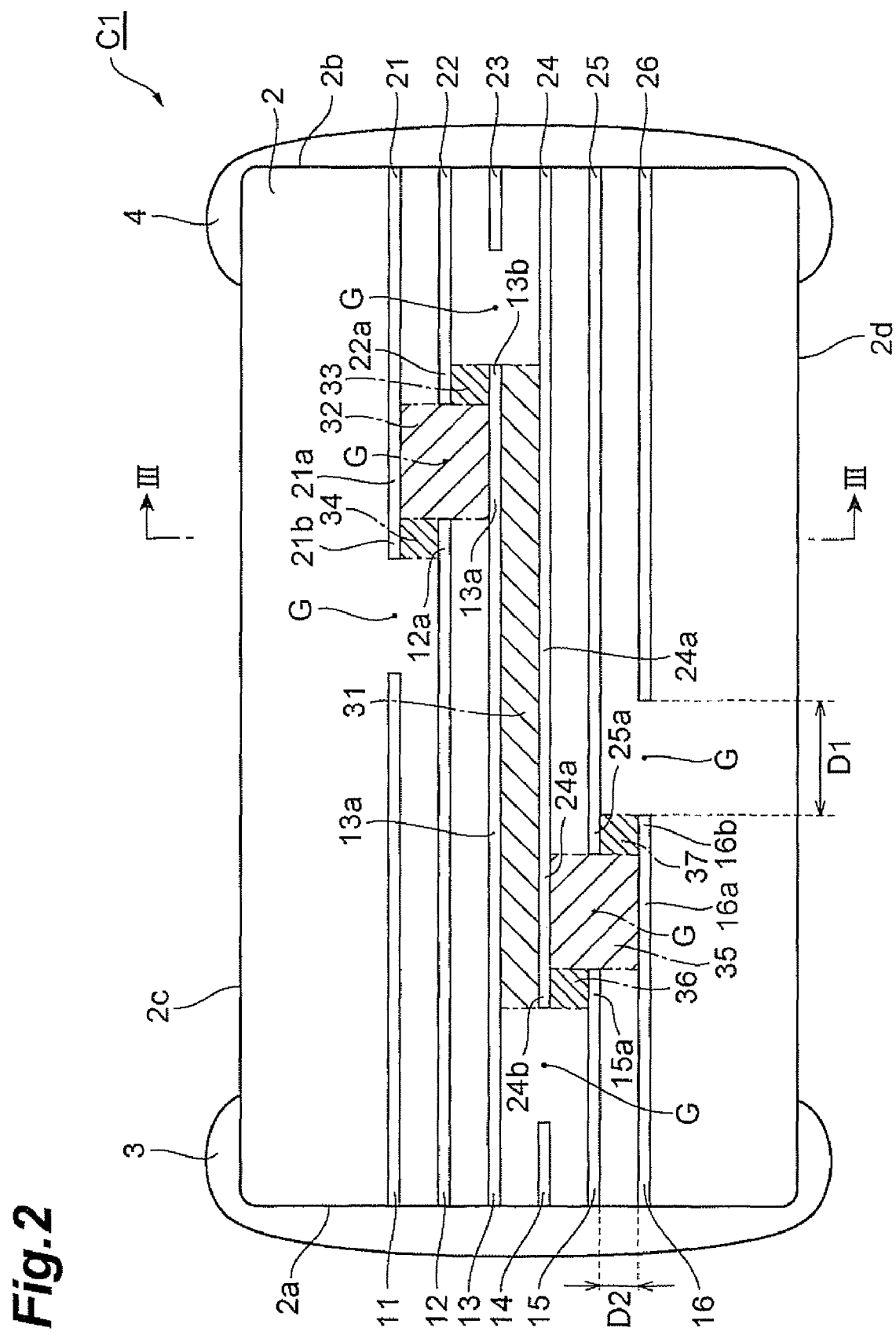
FIG. 2 is a schematic view for explaining a sectional configuration of the multilayer capacitor according to the first embodiment.
Figure 3:
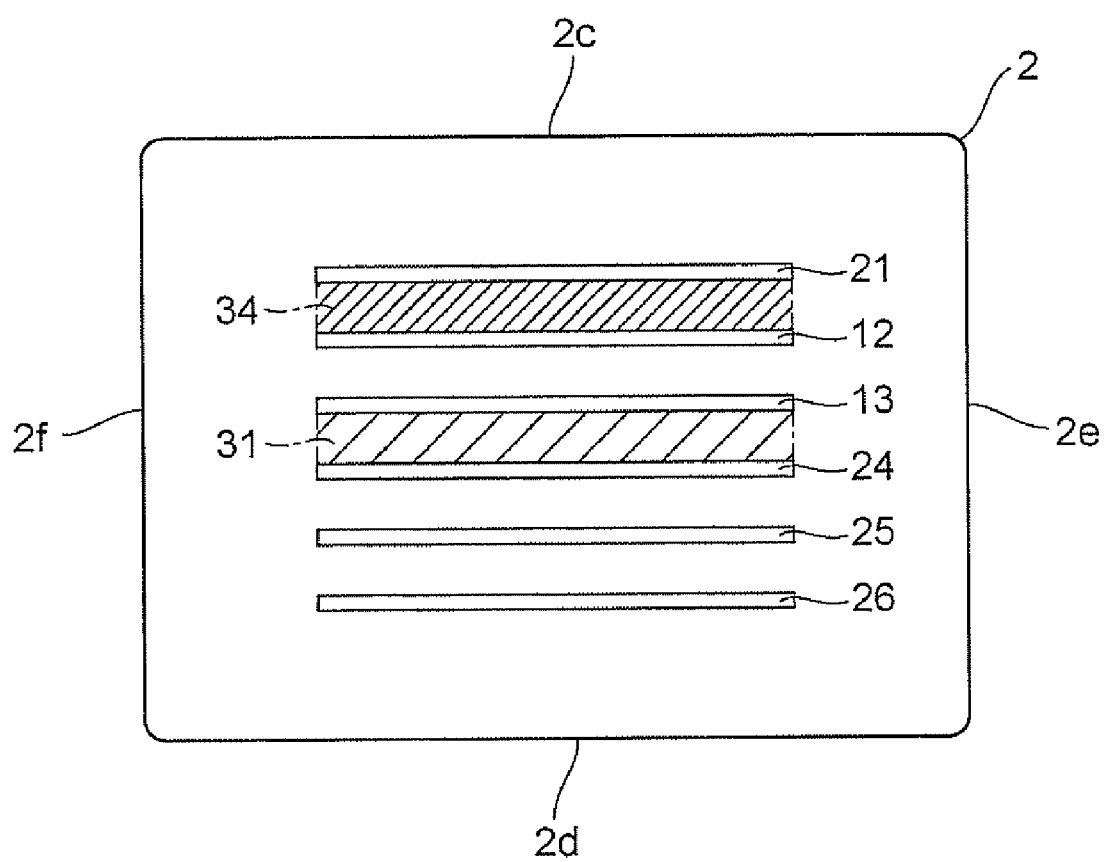
FIG. 3 is a schematic view for explaining a sectional configuration of an element body in the multilayer capacitor according to the first embodiment.

FIG. 2 is a schematic view for explaining a sectional structure in a plane parallel to the side faces 2e, 2f of the element body 2. The element body 2 is formed of a dielectric material in the nearly rectangular parallelepiped shape, inside which a plurality of internal electrodes 11-16, 21-26 (twelve internal electrodes in the present embodiment) are arranged in parallel with the side faces 2c, 2d of the element body 2. Because of this configuration, the dielectric material is interposed in a layer form between the plurality of internal electrodes 11-16, 21-26.

The internal electrodes 11-16, 21-26 are formed in a nearly rectangular shape when viewed from the side face 2c. The internal electrode 11 and the internal electrode 21 are arranged as separated in an identical layer. Similarly, the internal electrodes in each of the following pairs are also arranged as separated in an identical layer: internal electrode 12 and internal electrode 22; internal electrode 13 and internal electrode 23; internal electrode 14 and internal electrode 24; internal electrode 15 and internal electrode 25; and internal electrode 16 and internal electrode 26. Distances D1 of gaps G between the pairs of internal electrodes 11-16, 21-26 each arranged in an identical layer are approximately equal. The distances D1 of gaps G1 are distances between the pairs of internal electrodes 11-16, 21-26 in the opposed direction of the end face 2a and the end face 2b of the element body 2.

The internal electrodes 11-16 are arranged in order from the side face 2c side and an end forming one side of the rectangular shape of each internal electrode 11-16 is exposed in the end face 2a of the element body 2. This makes the internal electrodes 11-16 electrically and physically connected to the first terminal electrode 3 covering the end face 2a. The internal electrodes 21-26 are arranged in order from the side face 2c side and an end forming one side of the rectangular shape of each internal electrode 21-26 is exposed in the end face 2b of the element body 2. This makes the internal electrodes 21-26 electrically and physically connected to the second terminal electrode 4 covering the end face 2b. Distances D2 between the internal electrodes next to each other in the laminate direction (the opposed direction of the side face 2c and the side face 2d) among the internal electrodes 11-16, 21-26 are approximately equal.

The internal electrodes 11-16, 21-26 are arranged in the element body 2 so as to form a major capacitance forming portion 31 and first to third minor capacitance forming portions 32-37 each of which forms a capacitance. In FIGS. 2 and 3, hatched regions indicate the major capacitance forming portion 31 and the first to third minor capacitance forming portions 32-37. FIG. 3 is a schematic view showing a sectional configuration in a plane being parallel to the end face 2a and crossing the major capacitance forming portion 31 and the third minor capacitance forming portion 34. The major capacitance forming portion 31 and the first to third minor capacitance forming portions 32-37 are regions each of which forms a capacitance while being sandwiched between the internal electrodes connected to the respective terminal electrodes of the opposite polarities and opposed to each other among the internal electrodes 11-16, 21-26, and they are made of the dielectric material. The capacitance formed by the major capacitance forming portion 31 is larger than those formed by the first to third minor capacitance forming portions 32-37.

The arrangement of the internal electrodes 11-16, 21-26 for forming the major capacitance forming portion 31 and the first to third minor capacitance forming portions 32-37 will be specifically described. The major capacitance forming portion 31 is sandwiched between the internal electrode 13 and the internal electrode 24. The internal electrode 13 and the internal electrode 24 are arranged in the middle between the side face 2c and the side face 2d of the element body 2 and are connected to the respective terminal electrodes of the opposite polarities. The internal electrode 13 and the internal electrode 24 are arranged so that the area of electrode portions 13a, 24a opposed to each other in the laminate direction becomes relatively large. The electrode portion 13a of the internal electrode 13, the electrode portion 24a of the internal electrode 24, and the major capacitance forming portion 31 are superposed on each other when viewed from the side face 2c of the element body 2.

The first to third minor capacitance forming portions 32-34 are formed by the internal electrodes 12, 13, 21, 22. The internal electrodes 12, 22 are connected to the respective terminal electrodes of the opposite polarities and arranged with the gap G in an identical layer. The internal electrode 13 and the internal electrode 21 connected to the respective terminal electrodes of the opposite polarities are opposed to each other through the gap G between the internal electrode 12 and the internal electrode 22. The internal electrode 13 is opposed to both of the internal electrode 12 and internal electrode 22, and the internal electrode 21 is opposed to both of the internal electrode 12 and internal electrode 22.

The first minor capacitance forming portion 32 is a region sandwiched between an electrode portion 13a of the internal electrode 13 and an electrode portion 21a of the internal electrode 21 opposed to each other. The electrode portion 13a of the internal electrode 13, the electrode portion 21a of the internal electrode 21, and the first minor capacitance forming portion 32 are superposed on each other when viewed from the side face 2c of the element body 2.

The second minor capacitance forming portion 33 is a region sandwiched between an electrode portion 13b of the internal electrode 13 and an electrode portion 22a of the internal electrode 22 opposed to each other. The electrode portion 13b of the internal electrode 13, the electrode portion 22a of the internal electrode 22, and the second minor capacitance forming portion 33 are superposed on each other when viewed from the side face 2c of the element body 2.

The third minor capacitance forming portion 34 is a region sandwiched between an electrode portion 12a of the internal electrode 12 and an electrode portion 21b of the internal electrode 21 opposed to each other. The electrode portion 12a of the internal electrode 12, the electrode portion 21b of the internal electrode 21, and the third minor capacitance forming portion 34 are superposed on each other when viewed from the side face 2c of the element body 2.

The first to third minor capacitance forming portions 35-37 are formed in the same manner as above by the internal electrodes 15, 16, 24, 25. The internal electrodes 15, 25 are connected to the respective terminal electrodes of the opposite polarities and arranged with the gap G in an identical layer. The internal electrode 16 and the internal electrode 24 connected to the respective terminal electrodes of the opposite polarities are opposed to each other through the gap G between the internal electrode 15 and the internal electrode 25. The internal electrode 16 is opposed to both of the internal electrode 15 and the internal electrode 25, and the internal electrode 24 is opposed to both of the internal electrode 15 and internal electrode 25.

The first minor capacitance forming portion 35 is a region sandwiched between an electrode portion 16a of the internal electrode 16 and an electrode portion 24a of the internal electrode 24. The second minor capacitance forming portion 36 is a region sandwiched between an electrode portion 15a of the internal electrode 15 and an electrode portion 24b of the internal electrode 24. The third minor capacitance forming portion 37 is a region sandwiched between an electrode portion 16b of the internal electrode 16 and an electrode portion 25a of the internal electrode 25.

In the multilayer capacitor C1 of the present embodiment, the internal electrode 13 forming the major capacitance forming portion 31 also contributes to formation of the first and second minor capacitance forming portions 32, 33. The internal electrode 24 forming the major capacitance forming portion 31 also contributes to formation of the first and second minor capacitance forming portions 35, 36.

A production method of multilayer capacitor C1 will be described with reference to FIGS. 4A, 4B, and 5. First, as shown in FIG. 4A, a ceramic slurry, which is obtained by adding a binder resin, a solvent, a plasticizer, etc. into a dielectric material consisting primarily of barium titanate, is applied onto a support and dried to form a plurality of ceramic green sheets 41 which will become the dielectric layers. As shown in FIG. 4B, rectangular internal electrode patterns 42 are printed on the ceramic green sheets 41 to form a plurality of electrode-loaded ceramic green sheets 43. The internal electrode patterns 42 are formed as arrayed over one surface of each ceramic green sheet 41 and distances d1 of gaps between the internal electrode patterns 42 arrayed in one direction are approximately equal.

Figure 5:
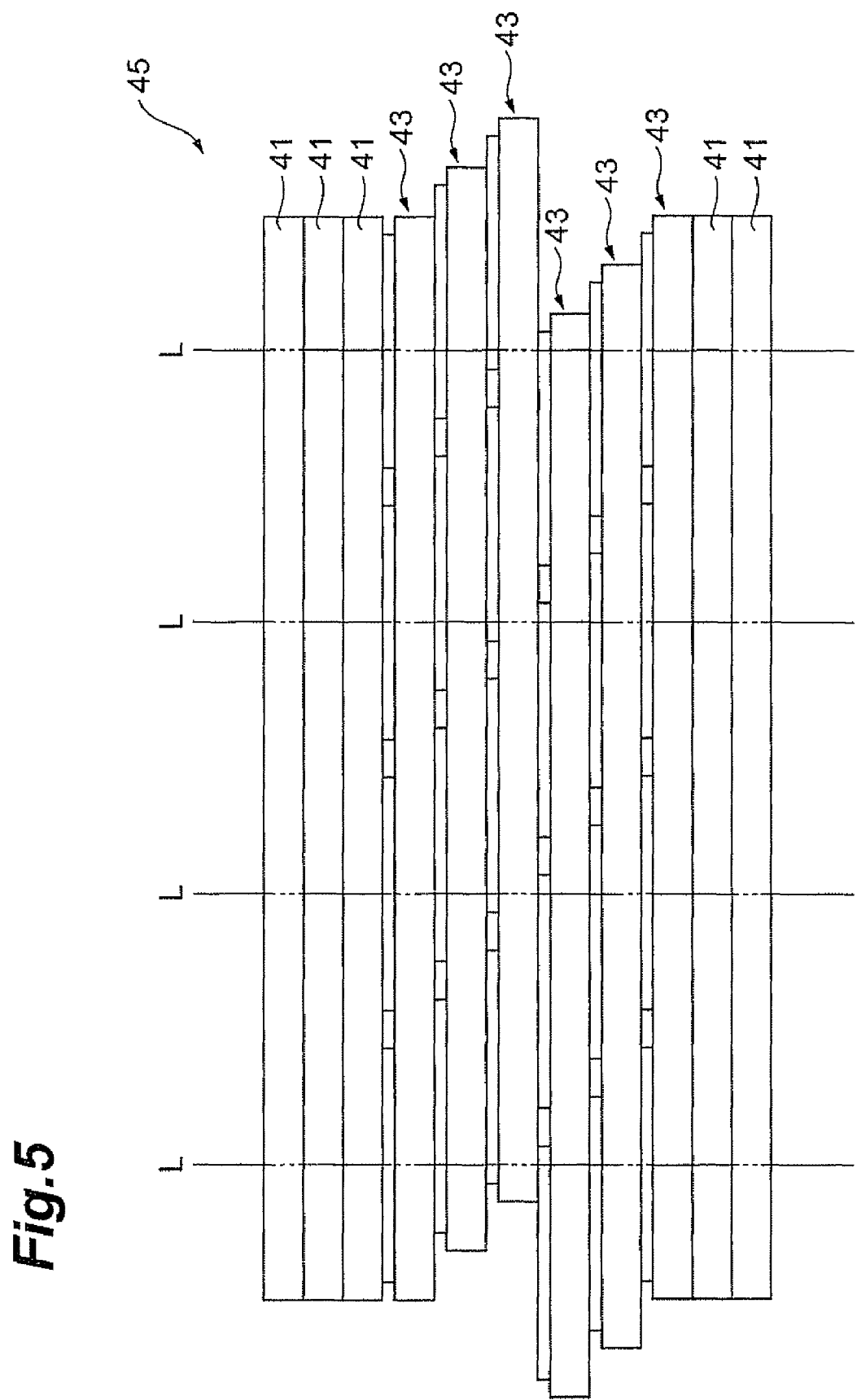
FIG. 5 is a schematic view for explaining a sectional configuration of a laminate formed in a process of producing the multilayer capacitor according to the first embodiment.

As shown in FIG. 5, the ceramic green sheets 41 without printing of internal electrode patterns and the electrode-loaded ceramic green sheets 43 with printing of the internal electrode patterns 42 are laminated in a predetermined order. The electrode-loaded ceramic green sheets 43 laminated all have the internal electrode patterns 42 printed in the same manner and are laminated so that the gaps between the internal electrode patterns 42 arrayed in one direction on each sheet are displaced by a predetermined distance from those on an adjacent sheet.

Then the laminate body 45 consisting of the laminate of ceramic green sheets 41, 43 is cut along cut lines L to form green element bodies. The cut lines L are set so that each green element body includes the internal electrode patterns 42 to become the internal electrodes 11-16, 21-26. Thereafter, the green element bodies are heated to perform drying, debindering, and firing, thereby forming element bodies 2. Then the first and second terminal electrodes 3, 4 are formed on the exterior surface of each element body 2.

The multilayer capacitor C1 described above has the major capacitance forming portion 31 and the first to third minor capacitance forming portions 32-37 as portions to form their respective capacitances. In the case where the capacitance is formed by the major capacitance forming portion 31 only, an electric current flows through only two internal electrodes, the internal electrode 13 and internal electrode 24. In contrast to it, the multilayer capacitor C1 has the first to third minor capacitance forming portions 32-37, whereby the internal electrodes 12, 15, 16, 21, 22, 25 also contribute to formation of the capacitance. This increases the number of internal electrodes carrying an electric current and thus decreases the resistance. Therefore, the Q-factor of the multilayer capacitor C1 can be made higher.

Incidentally, in the process of forming the element body 2, the electrode-loaded ceramic green sheets 43 can deviate in a direction perpendicular to the laminate direction during laminating the electrode-loaded ceramic green sheets 43 with printing of the internal electrode patterns 42. In this case, opposed areas between the internal electrodes will vary in the multilayer capacitor, thereby causing variation in capacitance. If a large number of internal electrodes are laminated in order to increase the Q-factor, the variation in capacitance is more likely to occur.

In order to suppress the occurrence of variation in capacitance, the multilayer capacitor C1 of the present embodiment is so configured that the first to third minor capacitance forming portions 32-34 are formed by the internal electrodes 12, 22 connected to the respective terminal electrodes of the opposite polarities and arranged as separated in the identical layer, and the internal electrodes 13, 21 connected to the respective terminal electrodes of the opposite polarities and opposed to each other through the gap G between the internal electrodes 12, 22 arranged in the identical layer, and both opposed to the internal electrodes 12, 22 arranged in the identical layer.

Figure 6A:
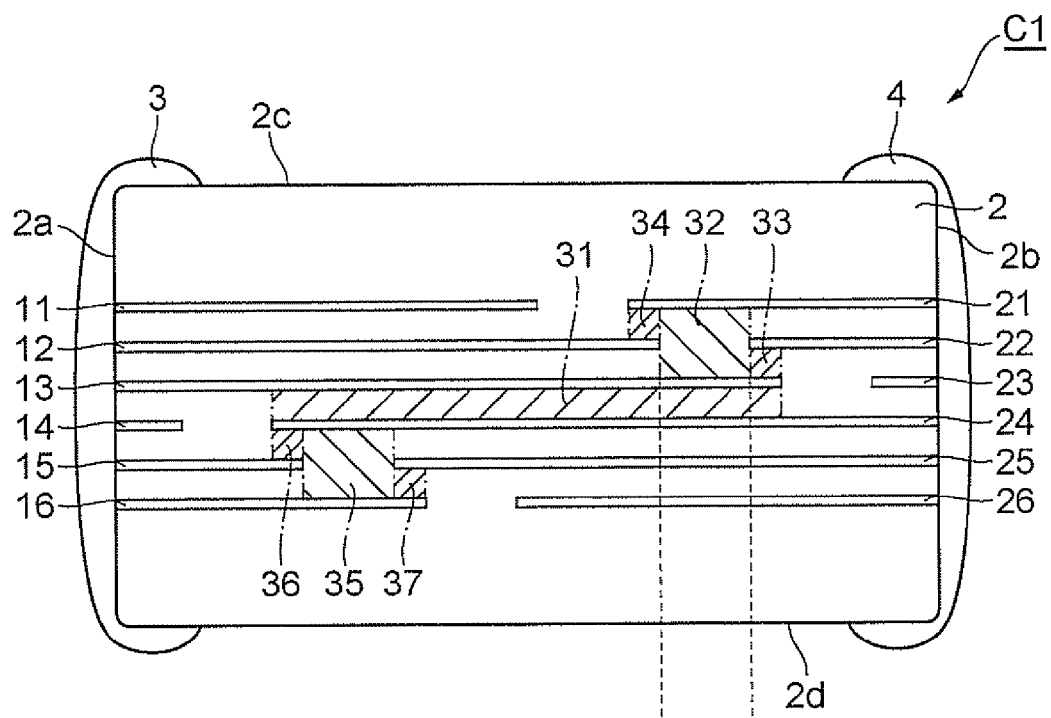
FIGS. 6A and 6B are schematic views for explaining the effect of the multilayer capacitor according to the first embodiment.
Figure 6B:
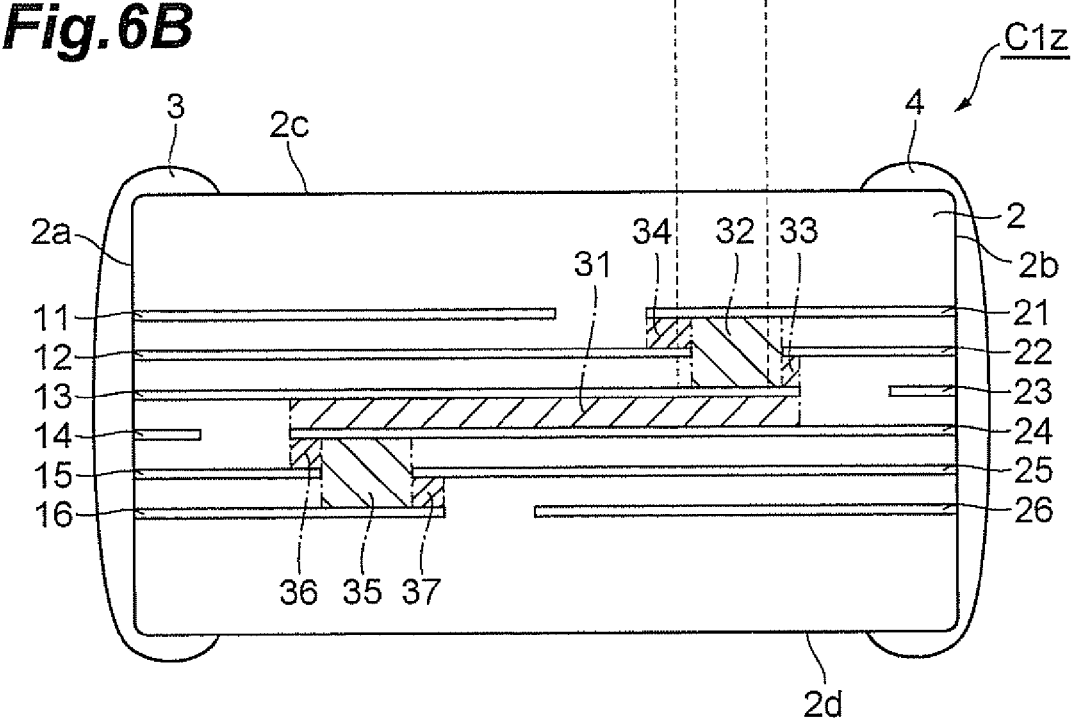

For example, as shown in FIGS. 6A and 6B, the internal electrodes 12, 22 arranged in the identical layer can deviate toward one end face 2b. FIG. 6A shows a cross section of the multilayer capacitor C1 in a configuration wherein the ceramic green sheets are laminated without any laminate deviation, and FIG. 6B shows a cross section of a multilayer capacitor C1z in a configuration wherein the internal electrodes 12, 22 arranged in an identical layer deviate toward one end face 2b because of occurrence of a laminate deviation. In FIGS. 6A and 6B, the hatched regions also indicate the major capacitance forming portion 31 and the first to third minor capacitance forming portions 32-37.

When the internal electrodes 12, 22 arranged in the identical layer deviate toward one end face 2b, the opposed area between the internal electrode 13 and the internal electrode 22 forming the second minor capacitance forming portion 33 becomes smaller. However, the opposed area between the internal electrode 12 and the internal electrode 21 forming the third minor capacitance forming portion 34 becomes larger by the degree of decrease in the opposed area between the internal electrode 13 and the internal electrode 22. Therefore, the capacitance of the second minor capacitance forming portion 33 decreases, while the capacitance of the third minor capacitance forming portion 34 increases. Namely, it is feasible to suppress change in the sum of the capacitances formed by the first to third minor capacitance forming portions 32-34 and thus to suppress the occurrence of variation in capacitance.

In the multilayer capacitor C1 of the present embodiment, the first to third minor capacitance forming portions 35-37 are also formed by the internal electrodes 15, 25 connected to the respective terminal electrodes of the opposite polarities and arranged as separated in the identical layer, and the internal electrodes 16, 24 connected to the respective terminal electrodes of the opposite polarities and opposed to each other through the gap G between the internal electrodes 15, 25 arranged in the identical layer, and both opposed to the internal electrodes 15, 25 arranged in the identical layer, as the first to third minor capacitance forming portions 32-34 are. For this reason, even in the case where the internal electrodes 15, 25 arranged in the identical layer deviate toward the end face 2a or 2b of the element body 2, it is feasible to suppress change in the sum of the capacitances formed by the first to third minor capacitance forming portions 35-37.

In the multilayer capacitor C1, the distance between the internal electrode 13 and the internal electrode 22 forming the second minor capacitance forming portion 33 is approximately equal to the distance between the internal electrode 12 and the internal electrode 21 forming the third minor capacitance forming portion 34. For this reason, if the internal electrodes 12, 22 arranged in the identical layer deviate toward the end face 2a or the end face 2b, the capacitance formed by either one of the second and third minor capacitance forming portions 33, 34 decreases, while the capacitance formed by the other minor capacitance forming portion increases by the degree of decrease. Therefore, it becomes feasible to keep constant the sum of the capacitances formed by the first to third minor capacitance forming portions 32-34, and to further suppress the variation in capacitance.

In the multilayer capacitor C1, the distance between the internal electrode 24 and the internal electrode 15 forming the second minor capacitance forming portion 36 is also approximately equal to the distance between the internal electrode 16 and the internal electrode 25 forming the third minor capacitance forming portion 37. For this reason, if the internal electrodes 15, 25 arranged in the identical layer deviate toward the end face 2a or the end face 2b, the capacitance formed by either one of the second and third minor capacitance forming portions 36, 37 decreases, while the capacitance formed by the other minor capacitance forming portion increases by the degree of decrease. Therefore, it becomes feasible to keep constant the sum of the capacitances formed by the first to third minor capacitance forming portions 35-37 and to further suppress the variation in capacitance.

Since the variation in capacitance is suppressed as described above, the variation in capacitance can be maintained within the tolerance even in the case where the capacitance of the multilayer capacitor C1 is small and the permissible tolerance for capacitance is small.

Other embodiments will be described below. The multilayer capacitors according to the other embodiments are different in the number and arrangement of the internal electrodes from the multilayer capacitor C1 of the first embodiment. The multilayer capacitors of the other embodiments are the same as the multilayer capacitor C1 of the first embodiment in that the internal electrodes are arranged with the gap G of the same distance D1 and in arrangement of two electrodes in an identical layer, in that the distances between the internal electrodes next to each other in the laminate direction are approximately equal, and in that the multilayer capacitor has the major capacitance forming portion and the first to third capacitance forming portions and each of these capacitance forming portions is sandwiched between the electrode portions of the internal electrodes superposed on each other when viewed from the side face 2c of the element body 2. The multilayer capacitors of the other embodiments will be described below with focus on different configurations from the multilayer capacitor C1 of the first embodiment, without description of the same configuration.

(Second Embodiment)

Figure 7:
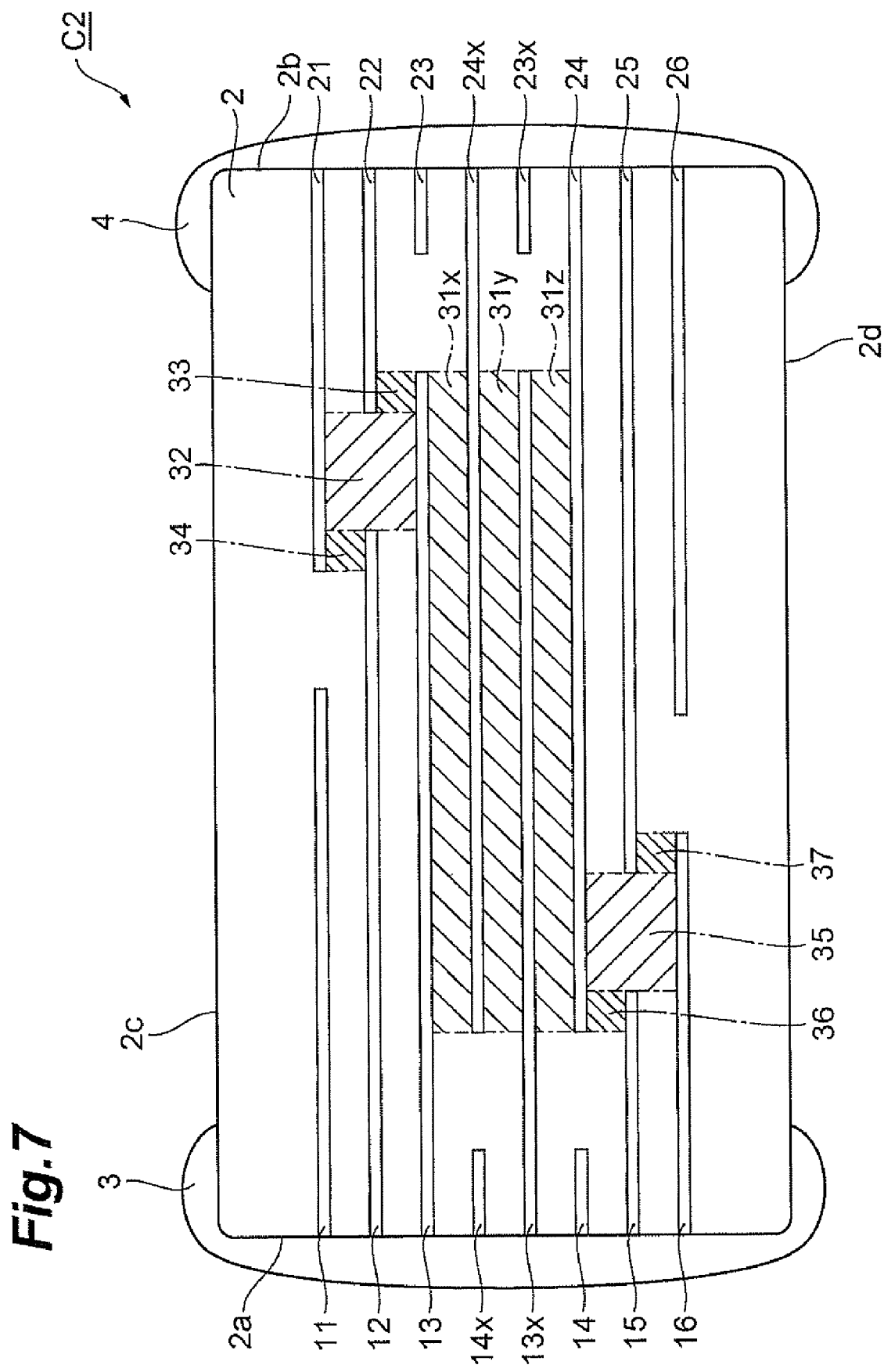
FIG. 7 is a schematic view for explaining a sectional configuration of the multilayer capacitor according to the second embodiment.

The multilayer capacitor C2 according to the second embodiment shown in FIG. 7 has three major capacitance forming portions 31x-31z. In FIG. 7, the hatched regions indicate the major capacitance forming portions 31x-31z and first to third minor capacitance forming portions 32-37. For forming the three major capacitance forming portions 31x-31z, the element body 2 has an internal electrode 13x and an internal electrode 24x between the internal electrode 13 and the internal electrode 24. The element body 2 has internal electrodes 23x, 14x each of which is arranged as separated in an identical layer with the internal electrode 13x or 24x, respectively.

The internal electrode 14x and the internal electrode 13x are arranged in order from the side face 2c side of the element body 2 and have the same shape as the internal electrode 14 and the internal electrode 13, respectively. The internal electrode 14x and the internal electrode 13x have one end exposed in the end face 2a and electrically and physically connected to the first terminal electrode 3. The internal electrode 24x and the internal electrode 23x are arranged in order from the side face 2c side of the element body 2 and have the same shape as the internal electrode 24 and the internal electrode 23, respectively. The internal electrode 24x and the internal electrode 23x have one end exposed in the end face 2b and electrically and physically connected to the second terminal electrode 4.

The major capacitance forming portion 31x is a region sandwiched between the internal electrode 13 and the internal electrode 24x connected to the respective terminal electrodes of the opposite polarities and opposed to each other. The major capacitance forming portion 31y is a region sandwiched between the internal electrode 24x and the internal electrode 13x connected to the respective terminal electrodes of the opposite polarities and opposed to each other. The major capacitance forming portion 31z is a region sandwiched between the internal electrode 13x and the internal electrode 24 connected to the respective terminal electrodes of the opposite polarities and opposed to each other. The capacitances formed by these major capacitance forming portions 31x-31z are approximately equal and larger than the capacitances formed by the first to third minor capacitance forming portions 32-37.

The multilayer capacitor C2 can have the capacitance larger than that of the multilayer capacitor C1, and can have a high Q-factor and suppress variation in capacitance as the multilayer capacitor C1. The number of major capacitance forming portion 31 is not limited to one or three, and a plurality of major capacitance forming portions 31 may be formed according to a desired capacitance.

(Third Embodiment)

Figure 8:
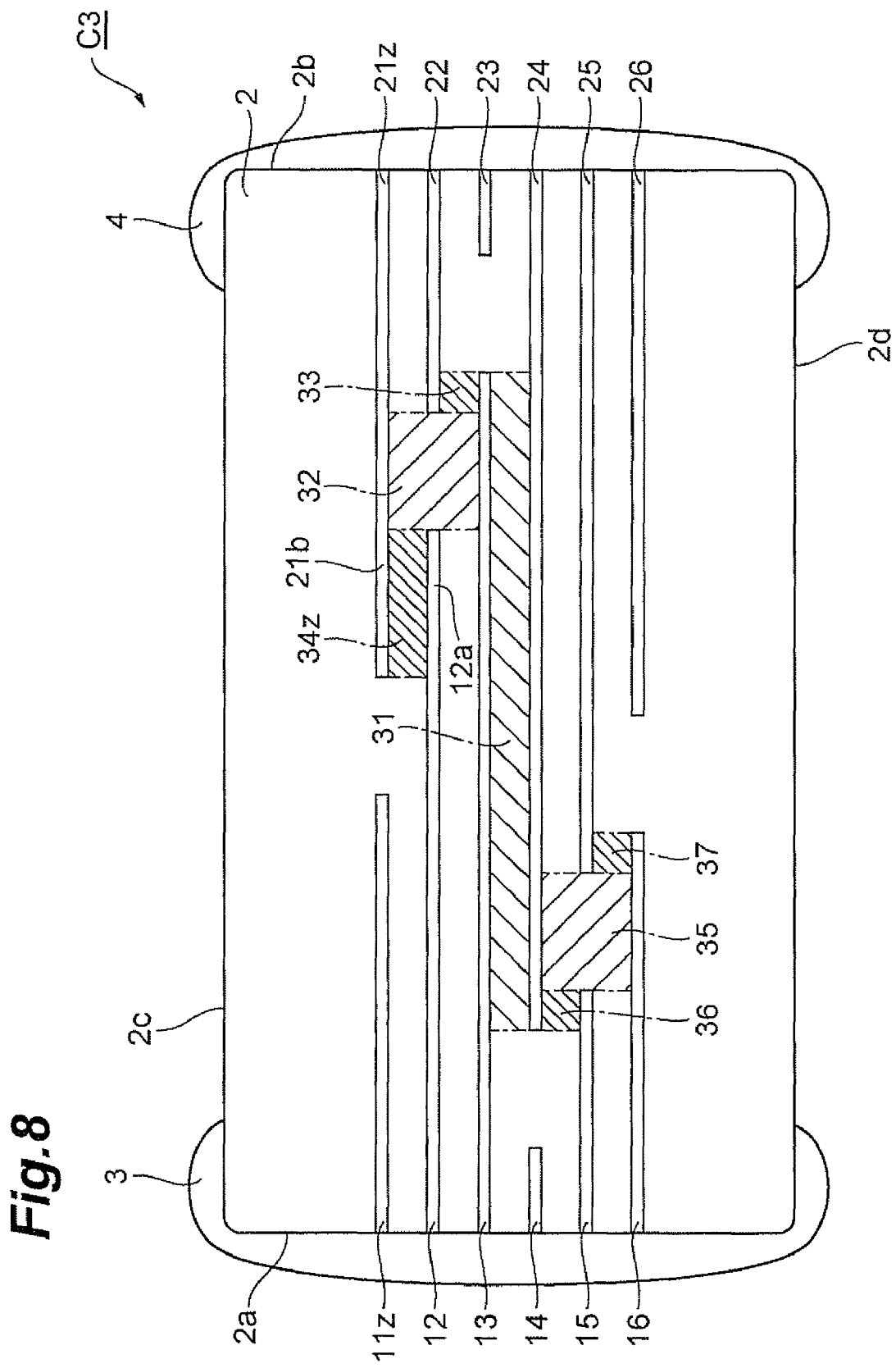
FIG. 8 is a schematic view for explaining a sectional configuration of the multilayer capacitor according to the third embodiment.

The multilayer capacitor C3 according to the third embodiment shown in FIG. 8 has the capacitance finely adjusted in comparison with the multilayer capacitor C1 of the first embodiment. The multilayer capacitor C3 has internal electrodes 11z, 21z instead of the internal electrodes 11, 21. The internal electrodes 11z, 21z are arranged as shifted from the position of the internal electrodes 11, 21 toward the end face 2a, relative to the other internal electrodes 12-16, 22-26. This configuration increases the opposed area between the internal electrode 21z and the internal electrode 12, so as to increase the capacitance formed by the third minor capacitance forming portion 34z between the internal electrode 21z and the internal electrode 12. In FIG. 8, the hatched regions indicate the major capacitance forming portion 31 and the first to third minor capacitance forming portions 32, 33, 34z, 35-37.

For finely adjusting the capacitance as described above, an amount of the shift is adjusted during laminating the electrode-loaded ceramic green sheet 43 with the internal electrode patterns 42 to become the internal electrodes 11z, 21z, in the process of forming the element body 2. Since the internal electrodes 11z, 21z are arranged nearest to the side face 2c, the shift of the internal electrodes 11z, 21z causes a change in the third minor capacitance forming portion 34z only. This allows accurate fine adjustment of the capacitance.

(Fourth Embodiment)

Figure 9:
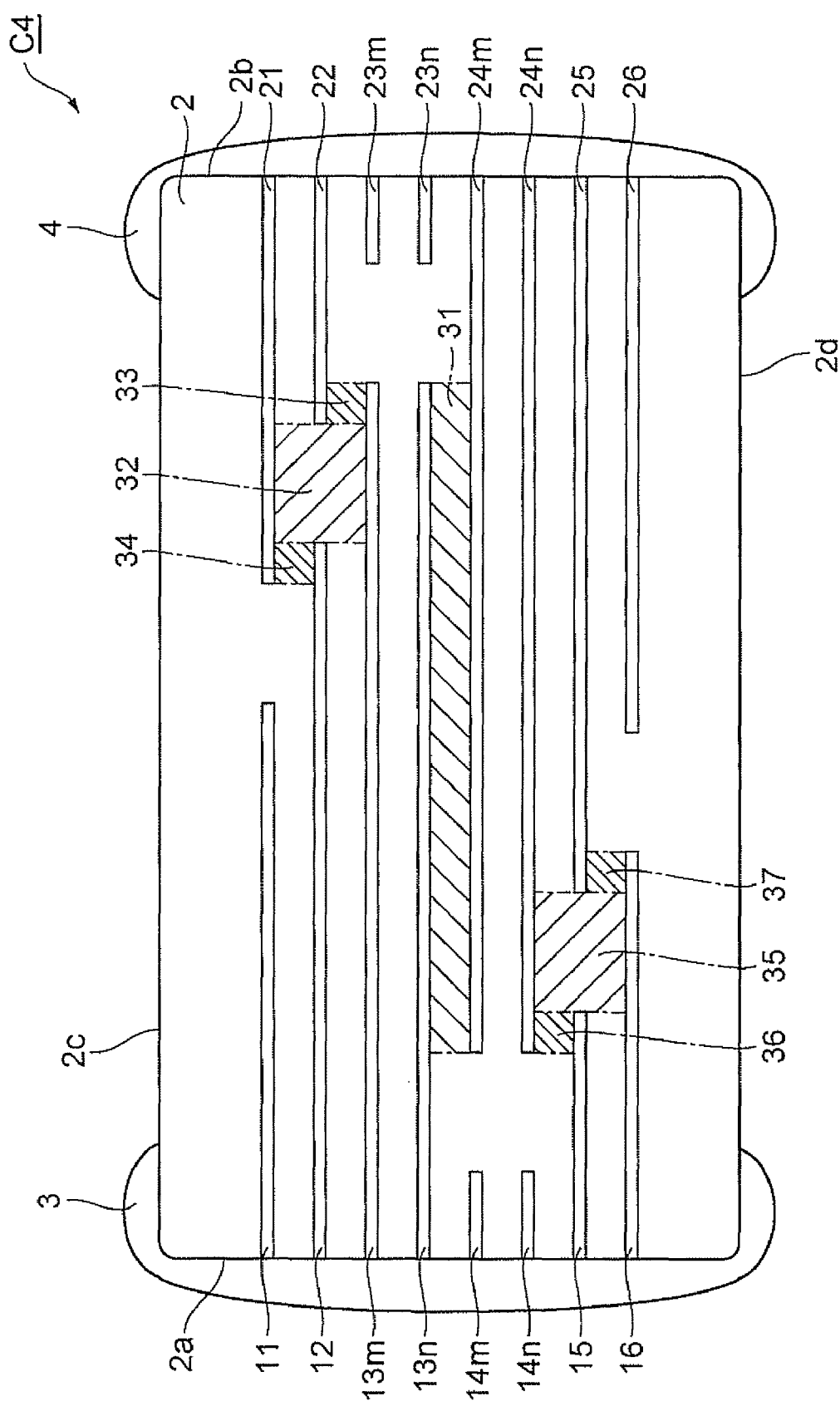
FIG. 9 is a schematic view for explaining a sectional configuration of the multilayer capacitor according to the fourth embodiment.

The multilayer capacitor C4 according to the fourth embodiment shown in FIG. 9 has two internal electrodes 13m, 13n of an identical shape instead of one internal electrode 13 and has two internal electrodes 14m, 14n of an identical shape instead of one internal electrode 14. The multilayer capacitor C4 has two internal electrodes 23m, 23n each of which is arranged in an identical layer with the internal electrode 13m or 13n, respectively, instead of the internal electrode 23, and has two internal electrodes 24m, 24n each of which is arranged in an identical layer with the internal electrode 14m or 14n, respectively, instead of the internal electrode 24. In FIG. 9, the hatched regions indicate the major capacitance forming portion 31 and the first to third minor capacitance forming portions 32-37.

The internal electrodes 13m, 13n are arranged next to each other in the laminate direction and their ends are exposed in the end face 2a to be electrically connected to the first terminal electrode 3. The internal electrode 13m is opposed to the internal electrode 21 through the gap G between the internal electrode 12 and the internal electrode 22 and further opposed to each of the internal electrodes 12, 22. Therefore, the internal electrode 13m contributes to formation of the first minor capacitance forming portion 32 and the second minor capacitance forming portion 33.

The internal electrodes 24m, 24n are arranged next to each other in the laminate direction and their ends are exposed in the end face 2b to be electrically connected to the second terminal electrode 4. The internal electrode 24n is opposed to the internal electrode 16 through the gap G between the internal electrode 15 and the internal electrode 25 and further opposed to each of the internal electrodes 15, 25. Therefore, the internal electrode 24n contributes to formation of the first minor capacitance forming portion 35 and the second minor capacitance forming portion 36.

The internal electrode 13n and the internal electrode 24m are opposed to each other and a region between them is the major capacitance forming portion 31.

The multilayer capacitor C1 of the first embodiment is so configured that an electric current flows through the eight internal electrodes 12, 13, 15, 16, 21, 22, 24, and 25. In the multilayer capacitor C4 of the present embodiment, the internal electrode 13n contributing to the major capacitance forming portion 31 and the internal electrode 13m contributing to the first and second minor capacitance forming portions 32, 33 are electrically connected to the terminal electrode of the same polarity (first terminal electrode 3) and arranged next to each other. The internal electrode 24m contributing to the major capacitance forming portion 31 and the internal electrode 24n contributing to the first and second minor capacitance forming portions 35, 36 are electrically connected to the terminal electrode of the same polarity (second terminal electrode 4) and arranged next to each other. For this reason, the multilayer capacitor C4 is so configured that an electric current flows through the ten internal electrodes 12, 13m, 13n, 15, 16, 21, 22, 24m, 24n, and 25. Therefore, the multilayer capacitor C4 has the larger number of internal electrodes carrying an electric current than the multilayer capacitor C1 does, and thus can have a higher Q-factor, with the same capacitance.

(Fifth Embodiment)

Figure 10:
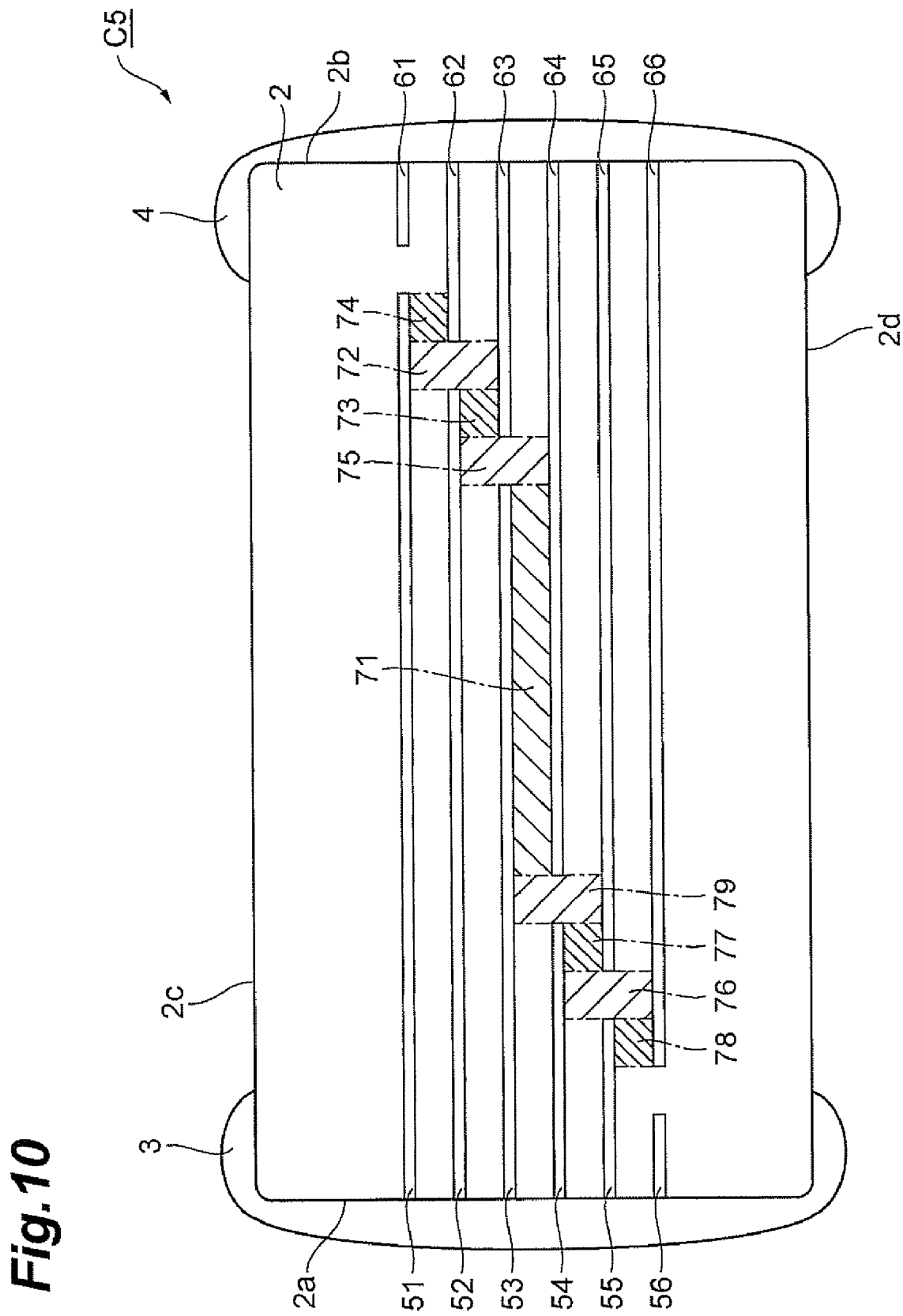
FIG. 10 is a schematic view for explaining a sectional configuration of the multilayer capacitor according to the fifth embodiment.

The multilayer capacitor C5 according to the fifth embodiment shown in FIG. 10 has internal electrodes 51-56, 61-66, instead of the internal electrodes 11-16, 21-26.

The internal electrodes 51-56 are arranged in order from the side face 2c side and their ends are exposed in the end face 2a of the element body 2 to be electrically and physically connected to the first terminal electrode 3. The internal electrodes 61-66 are arranged in order from the side face 2c side and their ends are exposed in the end face 2b of the element body 2 to be electrically and physically connected to the second terminal electrode 4.

The internal electrode 51 and the internal electrode 61 are arranged as separated in an identical layer. Similarly, the internal electrodes in each of the following pairs are also arranged as separated in an identical layer: internal electrode 52 and internal electrode 62; internal electrode 53 and internal electrode 63; internal electrode 54 and internal electrode 64; internal electrode 55 and internal electrode 65; and internal electrode 56 and internal electrode 66. Distances of gaps G between the pairs of internal electrodes 51-56, 61-66 each arranged in an identical layer are approximately equal.

The internal electrodes 51-56, 61-66 are so arranged in the element body 2 that a major capacitance forming portion 71 and first to fourth minor capacitance forming portions 72-79 to form respective capacitances are formed. The capacitance formed by the major capacitance forming portion 71 is larger than those formed by the first to fourth minor capacitance forming portions 72-79. In FIG. 10, the hatched regions indicate the major capacitance forming portion 71 and the first to fourth minor capacitance forming portions 72-79.

The arrangement of the internal electrodes 51-56, 61-66 forming the major capacitance forming portion 71 and the first to fourth minor capacitance forming portions 72-79 will be specifically described. The major capacitance forming portion 71 is sandwiched between the internal electrode 53 and the internal electrode 64. The internal electrode 53 and the internal electrode 64 are arranged in the middle between the side face 2c and the side face 2d of the element body 2 and are connected to the respective terminal electrodes of the opposite polarities. The internal electrode 53 and the internal electrode 64 are so arranged that the area of their electrode portions opposed to each other in the laminate direction becomes relatively large.

The first to fourth minor capacitance forming portions 72-75 are formed by the internal electrodes 51, 52, 62-64. The internal electrodes 52, 62 are connected to the respective terminal electrodes of the opposite polarities and are arranged with the gap G in an identical layer. The internal electrode 51 and the internal electrode 63 connected to the respective terminal electrodes of the opposite polarities are opposed to each other through the gap G between the internal electrode 52 and the internal electrode 62. The internal electrode 51 is opposed to both of the internal electrode 52 and the internal electrode 62 and the internal electrode 63 is opposed to both of the internal electrode 52 and the internal electrode 62.

The first minor capacitance forming portion 72 is sandwiched between the internal electrode 51 and the internal electrode 63 opposed to each other. The second minor capacitance forming portion 73 is sandwiched between the internal electrode 52 and the internal electrode 63 opposed to each other. The third minor capacitance forming portion 74 is sandwiched between the internal electrode 51 and the internal electrode 62 opposed to each other.

The internal electrode 53 contributing to formation of the major capacitance forming portion 71 and the internal electrode 63 contributing to formation of the first and second minor capacitance forming portions 72, 73 are connected to the respective terminal electrodes of the opposite polarities and arranged with the gap G. Therefore, the internal electrode 52 and the internal electrode 64 are opposed through the gap G between the internal electrode 53 and the internal electrode 63 to form the fourth minor capacitance forming portion 75.

The first to fourth minor capacitance forming portions 76-79 are formed by the internal electrodes 53-55, 65, 66. The internal electrodes 55, 65 are connected to the respective terminal electrodes of the opposite polarities and arranged with the gap G in an identical layer. The internal electrode 54 and the internal electrode 66 connected to the respective terminal electrodes of the opposite polarities are opposed to each other through the gap G between the internal electrode 55 and the internal electrode 65. The internal electrode 54 is opposed to both of the internal electrode 55 and the internal electrode 65, and the internal electrode 66 is opposed to both of the internal electrode 55 and the internal electrode 65.

The first minor capacitance forming portion 76 is sandwiched between the internal electrode 54 and the internal electrode 66 opposed to each other. The second minor capacitance forming portion 77 is sandwiched between the internal electrode 54 and the internal electrode 65 opposed to each other. The third minor capacitance forming portion 78 is sandwiched between the internal electrode 55 and the internal electrode 66 opposed to each other.

The internal electrode 64 contributing to formation of the major capacitance forming portion 71 and the internal electrode 54 contributing to formation of the first and second minor capacitance forming portions 76, 77 are connected to the respective terminal electrodes of the opposite polarities and arranged with the gap G. Therefore, the internal electrode 53 and the internal electrode 65 are opposed to each other through the gap G between the internal electrode 54 and the internal electrode 64 to form the fourth minor capacitance forming portion 79.

The multilayer capacitor C5 described above has the major capacitance forming portion 71 and the first to fourth minor capacitance forming portions 72-79 as portions to form their respective capacitances. For this reason, an electric current flows through the ten internal electrodes 51-55, 62-66, which makes the resistance smaller and the Q-factor higher.

In the multilayer capacitor C5 of the present embodiment, the first to third minor capacitance forming portions 72-74 are formed by the internal electrodes 52, 62 connected to the respective terminal electrodes of the opposite polarities and arranged as separated in the identical layer, and the internal electrodes 51, 63 connected to the respective terminal electrodes of the opposite polarities and opposed to each other through the gap G between the internal electrodes 52, 62 arranged in the identical layer, and both opposed to the internal electrodes 52, 62 arranged in the identical layer. In this configuration, if the internal electrodes 52, 62 arranged in the identical layer deviate toward the end face 2a or 2b, the capacitance formed by one minor capacitance forming portion of the second and third minor capacitance forming portions 73, 74 decreases, while the capacitance formed by the other minor capacitance forming portion increases; therefore, it is feasible to suppress change in the sum of the capacitances formed by the first to third minor capacitance forming portions 72-74. In consequence, it is feasible to suppress variation in capacitance.

In the multilayer capacitor C5 of the present embodiment, the first to third minor capacitance forming portions 76-78 are formed by the internal electrodes 55, 65 connected to the respective terminal electrodes of the opposite polarities and arranged as separated in the identical layer, and the internal electrodes 54, 66 connected to the respective terminal electrodes of the opposite polarities and opposed to each other through the gap G between the internal electrodes 55, 65 arranged in the identical layer, and both opposed to the internal electrodes 55, 65 arranged in the identical layer. In this configuration, if the internal electrodes 55, 65 arranged in the identical layer deviate toward the end face 2a or 2b, the capacitance formed by one minor capacitance forming portion of the second and third minor capacitance forming portions 77, 78 decreases, while the capacitance formed by the other minor capacitance forming portion increases; therefore, it is feasible to suppress change in the sum of the capacitances formed by the first to third minor capacitance forming portions 76-78. In consequence, it is feasible to suppress variation in capacitance.

The internal electrode 53 contributing to formation of the major capacitance forming portion 71 and the internal electrode 63 contributing to formation of the first and second minor capacitance forming portions 72, 73 are connected to the respective terminal electrodes of the opposite polarities and arranged with the gap G in the identical layer. In this configuration, if the internal electrodes 53, 63 arranged in the identical layer deviate toward the end face 2a or 2b, the capacitance formed by one capacitance forming portion of the major capacitance forming portion 71 and the second minor capacitance forming portion 73 decreases, while the capacitance formed by the other capacitance forming portion increases; therefore, it is feasible to suppress change in the sum of the capacitances formed in the multilayer capacitor C5. In consequence, it is feasible to suppress variation in capacitance.

The internal electrode 64 contributing to formation of the major capacitance forming portion 71 and the internal electrode 54 contributing to formation of the first and second minor capacitance forming portions 76, 77 are connected to the respective terminal electrodes of the opposite polarities and arranged with the gap G. In this configuration, if the internal electrodes 54, 64 arranged in the identical layer deviate toward the end face 2a or 2b, the capacitance formed by one capacitance forming portion of the major capacitance forming portion 71 and the second minor capacitance forming portion 77 decreases, while the capacitance formed by the other capacitance forming portion increases; therefore, it is feasible to suppress change in the sum of the capacitances formed in the multilayer capacitor C5. In consequence, it is feasible to suppress variation in capacitance.

In the multilayer capacitor C5, the distance between the internal electrode 52 and the internal electrode 63 forming the second minor capacitance forming portion 73 is approximately equal to the distance between the internal electrode 51 and the internal electrode 62 forming the third minor capacitance forming portion 74. In this configuration, if the internal electrodes 52, 62 arranged in the identical layer deviate toward the end face 2a or the end face 2b, the capacitance formed by one minor capacitance forming portion of the second and third minor capacitance forming portions 73, 74 decreases, while the capacitance formed by the other minor capacitance forming portion increases by the degree of decrease. Therefore, it becomes feasible to keep constant the sum of the capacitances formed by the first to third minor capacitance forming portions 72-74 and thus to further suppress the variation in capacitance.

In the multilayer capacitor C5, the distance between the internal electrode 52 and the internal electrode 63 forming the second minor capacitance forming portion 73 is approximately equal to the distance between the internal electrode 53 and the internal electrode 64 forming the major capacitance forming portion 71. In this configuration, if the internal electrodes 53, 63 arranged in the identical layer deviate toward the end face 2a or the end face 2b, the capacitance formed by one capacitance forming portion of the major capacitance forming portion 71 and the second minor capacitance forming portion 73 decreases, while the capacitance formed by the other capacitance forming portion increases by the degree of decrease. Therefore, it becomes feasible to keep constant the capacitances formed in the multilayer capacitor C5, and thus to further suppress the variation in capacitance.

In the multilayer capacitor C5, the distance between the internal electrode 54 and the internal electrode 65 forming the second minor capacitance forming portion 77 is approximately equal to the distance between the internal electrode 55 and the internal electrode 66 forming the third minor capacitance forming portion 78. In this configuration, if the internal electrodes 55, 65 arranged in the identical layer deviate toward the end face 2a or the end face 2b, the capacitance formed by one minor capacitance forming portion of the second and third minor capacitance forming portions 77, 78 decreases, while the capacitance formed by the other minor capacitance forming portion increases by the degree of decrease. Therefore, it becomes feasible to keep constant the sum of the capacitances formed by the first to third minor capacitance forming portions 76-78 and thus to further suppress the variation in capacitance.

In the multilayer capacitor C5, the distance between the internal electrode 54 and the internal electrode 65 forming the second minor capacitance forming portion 77 is approximately equal to the distance between the internal electrode 53 and the internal electrode 64 forming the major capacitance forming portion 71. In this configuration, if the internal electrodes 54, 64 arranged in the identical layer deviate toward the end face 2a or the end face 2b, the capacitance formed by one capacitance forming portion of the major capacitance forming portion 71 and the second minor capacitance forming portion 77 decreases, while the capacitance formed by the other capacitance forming portion increases by the degree of decrease. Therefore, it becomes feasible to keep constant the capacitances formed in the multilayer capacitor C5, and thus to further suppress the variation in capacitance.

Since the variation in capacitance is suppressed as described above, the variation in capacitance can be maintained within the permissible tolerance for capacitance even in the case where the capacitance of the multilayer capacitor C5 is small and the permissible tolerance for capacitance is small.

The present invention is by no means limited to the above-described first to fifth embodiments, but can be modified in various ways. For example, the distances between the internal electrodes next to each other in the laminate direction were approximately equal, but they may be different from each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
an element body formed in a nearly rectangular parallelepiped shape; and
at least a pair of terminal electrodes formed on respective end faces opposed to each other in the element body, and having opposite polarities,
wherein the element body includes a major capacitance forming portion to form a capacitance, and first to third minor capacitance forming portions to form respective capacitances smaller than the capacitance formed by the major capacitance forming portion,
wherein the major capacitance forming portion is formed by first and second internal electrodes connected to the respective terminal electrodes of the opposite polarities, and
wherein the first to third minor capacitance forming portions are formed by third and fourth internal electrodes connected to the respective terminal electrodes of the opposite polarities and arranged as separated by a gap in an identical layer, and fifth and sixth internal electrodes connected to the respective terminal electrodes of the opposite polarities and opposed to each other through the gap, and both opposed to the third and fourth internal electrodes, such that the fifth internal electrode and the sixth internal electrode produce the first minor capacitance forming portion, the fourth internal electrode and the fifth internal electrode produce the second minor capacitance forming portion, and the third internal electrode and the sixth internal electrode produce the third minor capacitance forming portion.

2. The multilayer capacitor according to claim 1,
wherein one of the first and second internal electrodes forming the major capacitance forming portion, and the fifth internal electrode are an identical internal electrode.

3. The multilayer capacitor according to claim 1,
wherein one of the first and second internal electrodes forming the major capacitance forming portion, and the fifth internal electrode are electrically connected to the terminal electrode of the same polarity and arranged next to each other.

4. The multilayer capacitor according to claim 1,
wherein one of the first and second internal electrodes forming the major capacitance forming portion, and the sixth internal electrode are connected to the respective terminal electrodes of the opposite polarities and arranged as separated in an identical layer.

5. The multilayer capacitor according to claim 1,
wherein the third and fourth internal electrodes are so arranged that a distance to the fifth internal electrode is substantially equal to a distance to the sixth internal electrode.

6. A multilayer capacitor comprising:
an element body of a nearly rectangular parallelepiped shape; and
a first terminal electrode and a second terminal electrode formed on respective end faces opposed to each other in the element body,
wherein the element body has a major capacitance forming portion to form a first capacitance, and a minor capacitance forming portion to form a plurality of second capacitances smaller than the first capacitance,
wherein the major capacitance forming portion includes:
a first internal electrode connected to the first terminal electrode, and
a second internal electrode opposed to the first internal electrode and connected to the second terminal electrode,
wherein the minor capacitance forming portion includes:
a third internal electrode connected to the first terminal electrode;
a fourth internal electrode arranged as separated from the third internal electrode in an identical layer and connected to the second terminal electrode;
a fifth internal electrode opposed to the third and fourth internal electrodes and connected to the first terminal electrode, such that the fifth internal electrode and the fourth internal electrode produce a first minor capacitance; and
a sixth internal electrode opposed to the third and fourth internal electrodes and opposed to the fifth internal electrode through a region between the third and fourth internal electrodes, said sixth internal electrode being connected to the second terminal electrode, such that the sixth internal electrode and the third internal electrode produce a second minor capacitance and the sixth internal electrode and the fifth internal electrode produce a third minor capacitance.

7. The multilayer capacitor according to claim 6,
wherein the first internal electrode and the fifth internal electrode are an identical internal electrode.

8. The multilayer capacitor according to claim 6,
wherein the first internal electrode and the fifth internal electrode are arranged next to each other in different layers.

9. The multilayer capacitor according to claim 6,
wherein the first internal electrode and the sixth internal electrode are arranged as separated from each other in an identical layer.

10. The multilayer capacitor according to claim 6,
wherein a space in an opposed direction between the third and fourth internal electrodes and the fifth internal electrode is substantially equal to a space in an opposed direction between the third and fourth internal electrodes and the sixth internal electrode.

* * * * *